United States Patent [19]

Burant

[11] 4,021,597

[45] May 3, 1977

[54] SEA WATER BATTERY WITH A LEAD CHLORIDE CATHODE AND METHOD OF MAKING THE SAME

[75] Inventor: Leonard Joseph Burant, Milwaukee, Wis.

[73] Assignee: Globe-Union Inc., Milwaukee, Wis.

[22] Filed: Jan. 28, 1976

[21] Appl. No.: 653,270

[52] U.S. Cl. .............................. 429/119; 429/225
[51] Int. Cl.² ..................................... H01M 6/34
[58] Field of Search ...... 136/26, 27, 100 M, 100 R; 429/225–228, 119

[56] References Cited
UNITED STATES PATENTS

| | | |
|---|---|---|
| 3,468,710 | 9/1969 | Krasnow et al. .................. 136/26 |
| 3,943,004 | 3/1976 | Honer et al. .................. 136/100 M |

*Primary Examiner*—C. F. Lefevour

*Attorney, Agent, or Firm*—James L. Kirschnik; John Phillip Ryan

[57] ABSTRACT

A lead chloride cathode suitable for use in seawater batteries comprises a supporting electrically conductive grid to which lead chloride is applied by dipping the grid in a molten lead chloride bath. The grid is preferably made of mesh or expanded metal, and after allowing the lead chloride to solidify, a conductive matrix is formed in the cathode by inserting it in a salt solution and partially discharging it to form electrically conductive lead pathways within the cathode adjacent the points at which the grid material is closest to the surface and the grid itself. The preferred method comprises dipping the mesh or grid material in molten lead chloride, removing the grid and the adhering lead chloride, allowing the lead chloride to solidify, and partially discharging the cathode to form conductive lead portions.

14 Claims, 4 Drawing Figures

SEA WATER BATTERY WITH A LEAD CHLORIDE CATHODE AND METHOD OF MAKING THE SAME

BACKGROUND OF THE INVENTION

This invention relates to seawater batteries in which an anode and a cathode are activated by immersion in salt water to produce an electrical potential between the anode and the cathode. Such batteries typically utilize silver chloride as a cathode material, however, recent increases in the cost of silver has made it desirable to find alternative materials. In this regard, $PbO_2$ has been utilized as a cathode material, however, it is not entirely satisfactory in that the voltage dissipates rapidly during use. Lead chloride has also been known to be useable as a cathode material, however, the primary disadvantage of lead chloride is that it is relatively brittle and subject to cracking. U.S. Pat. No. 3,468,710 to Krasnow et al, issued Sept. 23, 1969, discloses a lead chloride cathode in which the lead chloride is applied to a fibrous supporting structure. The lead chloride is applied by dipping the high temperature resistant fibers in a lead chloride bath, after solidification, the cathode is coated with a lead paint for starting the chemical reaction when the cathode is immersed in salt water.

SUMMARY OF THE INVENTION

It is an object of the present invention to provide a cathode material for use in seawater batteries which is easily manufactured, reliable and which utilizes relatively inexpensive materials.

Another object of the invention is to provide a low cost cathode for a seawater battery having improved start up characteristics.

It is a further object of the invention to provide a method of producing a cathode for use in a seawater battery.

Other objects and advantages of the present invention will become apparent from the description of a preferred embodiment which follows.

Basically the invention provides a cathode for use in seawater batteries which comprises lead chloride deposited on a supporting metallic grid structure. The grid structure may be selected from the group of metals which are electrochemically stable in a seawater battery system. After applying the lead chloride to the grid structure, a conductive matrix is formed in the lead chloride by partially discharging the cathode while immersed in a salt water solution. The process according to the invention comprises dipping a metallic grid structure into a bath of molten lead chloride, removing the grid from the bath, allowing the lead chloride to solidify and partially discharging the cathode to form a conductive matrix in the lead chloride.

DESCRIPTION OF THE PREFERRED EMBODIMENT

Figure 1:
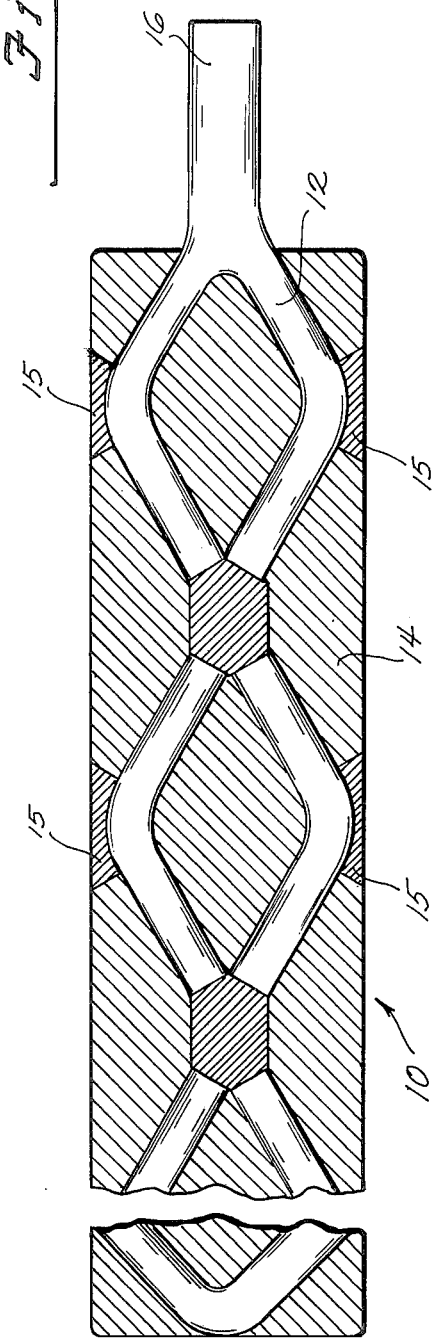
FIG. 1 is a cross sectional view of a cathode made according to the present invention.

Referring to FIG. 1, a cathode 10 according to the invention comprises a grid 12 made of expanded nickel which forms an interconnecting network of peaks, valleys and apertures. The grid 12 is dipped in a bath of molten $PbCl_2$ which results in the depositing of $PbCl_2$ material 14 which coats the grid 12 and substantially fills the peaks, valleys and apertures. After partial discharge, as will be described hereinafter, a matrix of small islands 15 of conductive Pb are formed at the points where the expanded 12 is closest to the surface of the coating of lead chloride 14. A suitable lug 16 is provided at the top of the expanded metal grid 12 for gripping the grid while it is dipped in the lead chloride bath and also for providing a point for a suitable connection within a battery in a conventional manner.

To prepare a cathode according to the present invention, a quantity of commercial grade $PbCl_2$ containing trace impurities is heated in a suitable container until it becomes molten. The temperature of the bath has been found to effect the amount of $PbCl_2$ which adheres to the grid material. That is, the higher the bath temperature the less $PbCl_2$ which will adhere to the grid. The amount of adhesion is also governed by such factors as dip time, i.e., the length of time in which the grid is permitted to stand in the bath. In general, the shorter the dip time, the more $PbCl_2$ which will adhere to the grid. The mesh size of the grid material is also relevant and larger mesh sizes reduce the amount of adhesion. Preferably a nickel grid is utilized which can be either formed from woven nickel wire or expanded nickel metal may be used. Other metals could also be employed as supporting materials such as Ca, Ag, Pd, Pt, Ti, Au, etc. or various alloys such as stainless steel or Monel as long as they are electrochemically stable in a seawater battery system as will be apparent to those skilled in the art. By varying the aforementioned factors, a suitable amount of $PbCl_2$ may be deposited on the grid which will result in a given plate performance. As will be appreciated by those skilled in the art, the more $PbCl_2$ present on the grid, the longer the performance life of the plate.

Figure 2:
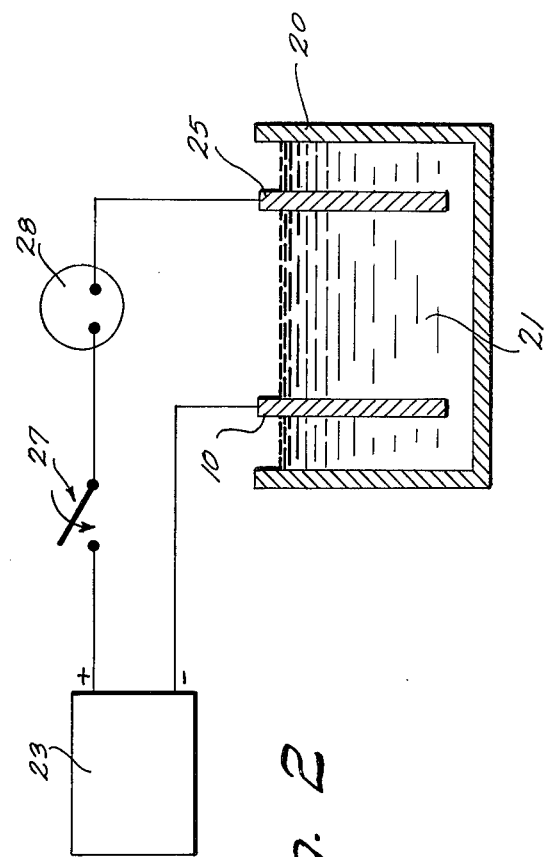
FIG. 2 is a schematic depiction of the apparatus utilized to form a cathode according to the present invention.

After dipping the grid in molten $PbCl_2$, it is withdrawn and allowed to cool so that the $PbCl_2$ solidifies. Because of the relatively short dip time generally utilized, no appreciable chemical reaction takes place between the grid and the molten $PbCl_2$. After solidification of the $PbCl_2$, the plate is partially discharged using a system as schematically depicted in FIG. 2. As shown, a suitable container 20 containing an electrolyte salt solution 21 such as NaCl is provided. The cathode 10 is connected to the negative terminal of a suitable DC power source 23. A spaced aluminum anode 25 is immersed in the solution and connected to the positive terminal of the power source 23 and a switch 27 is provided for completing the circuit. An ameter 28 is provided for monitoring the amount of current flow through the system. Closing switch 27 will partially discharge the cathode 10 to form the Pb matrix as shown in FIG. 1 by reducing the $PbCl_2$ to form Pb according to the following reaction:

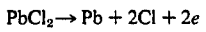

$PbCl_2 \rightarrow Pb + 2Cl + 2e$

The partial discharge of the $PbCl_2$ initially takes place at the portions of the $PbCl_2$ 14 which are closest to the grid material 12 as shown in FIG. 1. The discharge is carried out for a period of time sufficient to form enough Pb to provide initial current flow when the cathode is incorporated in a seawater battery and immersed in sea water. This partial discharge procedure eliminates the steps which were previously taken in the art to provide initial current flow such as application of discrete conducting wires or conductive paint to the surface of the cathode.

Figure 3:
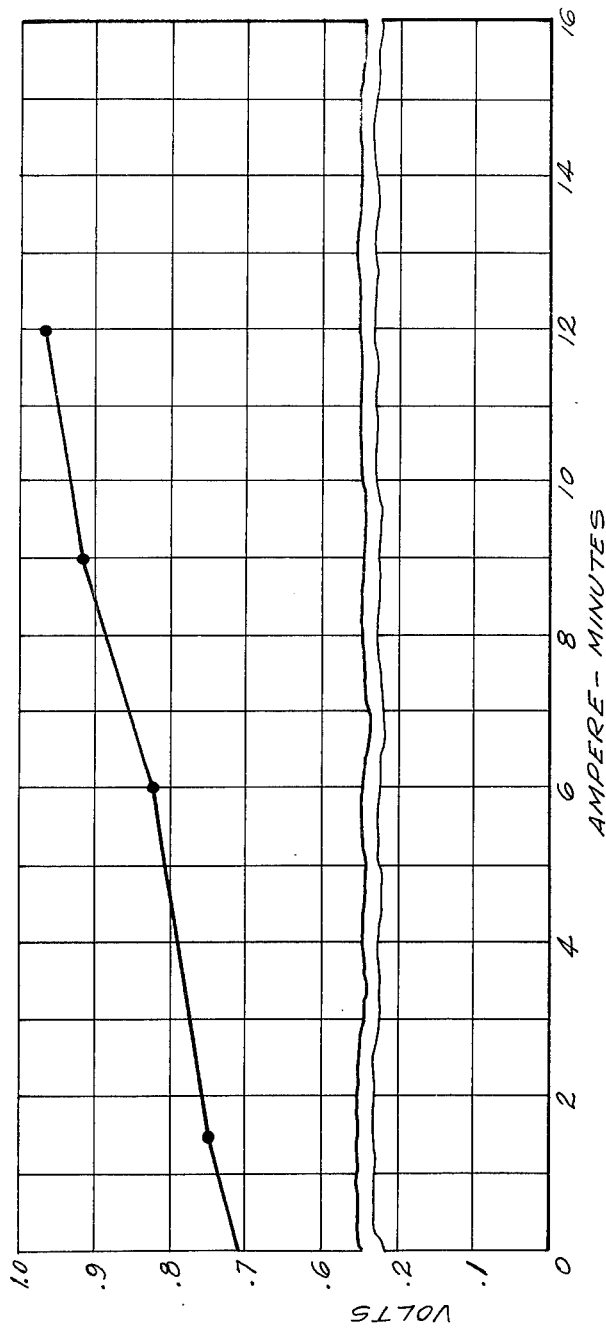
FIG. 3 is a graph depicting the effect of partial discharge current on the starting voltage of a cathode according to the invention; nd
Figure 4:
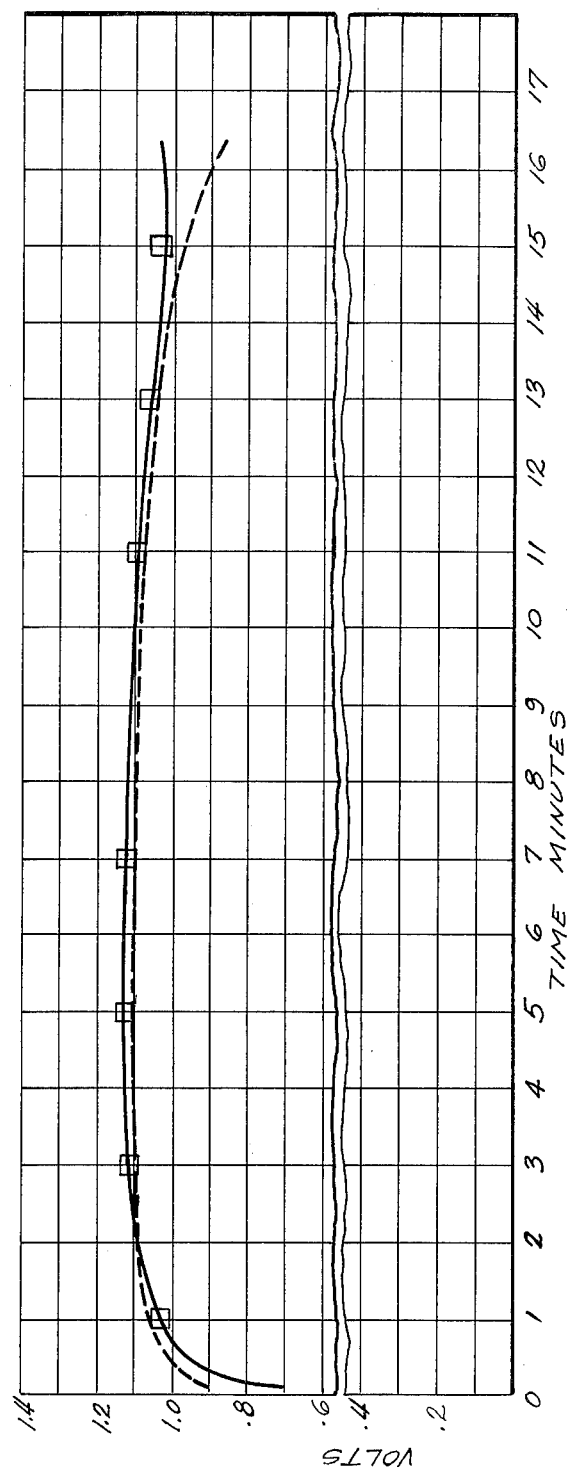
FIG. 4 is a graph comparing the performance of a cathode according to the invention with a plain lead chloride cathode.

FIG. 3 is illustrative of the effect of the discharge current in ampere-minutes on the initial voltage developed by one cell of a $PbCl_2$ cathode. FIG. 4 is a comparison of the performance of a single cell having a $PbCl_2$ cathode which is partially discharged according to the invention and a $PbCl_2$ cathode which has no prior discharge. The solid line is a plot of the discharge curve of an untreated $PbCl_2$ cathode in a 4° C, 2.2% saline solution at 0.23 amperes per inch$^2$. The dashed line is a plot of the performance of a partially discharged $PbCl_2$ cathode according to the invention under the same conditions. Note the increased starting voltage of the treated cathode with a slight reduction in voltage after 13 minutes.

While one embodiment of the invention has just been described, it will be appreciated by those skilled in the art that numerous other variations are possible. For example, although nickel was described as the preferred grid material, any suitable other metallic supporting grid could be utilized as long as the metal is electrochemically stable in a seawater battery system. Accordingly, the scope of the invention is not to be limited by the foregoing description but is to be taken solely by an interpretation of the claims which follow.

I claim:

1. A predischarge cathode for use in fabricating a seawater battery cell, comprising:
   a metallic grid having peak and valley surfaces, said grid being formed of a metal which is stable in a lead chloride seawater battery system;
   terminal means electrically connected to said grid;
   a coating of lead chloride supported on said grid surfaces, said coating having an outer reaction surface; and
   a matrix to conductive lead formed in situ to provide initial current flow intermediate portions of said coating outer reaction surface and contiguous peaked portions of said grid surfaces providing a current discharge path between said reaction surface and said grid.

2. A cathode as set forth in claim 1 wherein:
   said lead chloride is applied by dipping said grid in molten lead chloride.

3. A cathode as set forth in claim 1, wherein:
   said grid is selected from the group of calcium, silver, nickel, palladium, platinum, gold, titanium, stainless steel and Monel.

4. A cathode as set forth in claim 2, wherein:
   said grid comprises expanded metal.

5. A cathode as set forth in claim 2, wherein:
   said grid comprises an expanded nickel mesh.

6. A cathode as set forth in claim 3 wherein:
   said lead chloride is applied by dipping said grid in molten lead chloride.

7. A method of making a predischarge cathode for use in fabricating a predischarge seawater battery cell comprising the steps of:
   providing a metallic grid stable in a lead chloride seawater battery system, said grid having peak and valley surfaces;
   providing terminal means electrically connected to said grid;
   dipping said grid into molten lead chloride;
   removing said grid and allowing the adhering lead chloride to solidify and provide a deposited and supported coating having an outer reaction surface portion which covers said grid peaked surfaces; and,
   forming in situ a matrix of lead extending between said peaked grid surfaces and the adjacent reaction surface of said lead chloride by partially discharging said cathode in an electrolyte solution.

8. The method as set forth in claim 7, wherein:
   said grid comprises an expanded metal mesh.

9. The method as set forth in claim 7, wherein:
   said grid is selected from the group of calcium, silver, nickel, palladium, platinum, gold, titanium, stainless steel and Monel.

10. The method as set forth in claim 7, wherein:
    said grid comprises an expanded nickel mesh.

11. A predischarge seawater battery cell which comprises an anode element and a predischarge cathode element spatially separated from said anode, said cathode comprising:
    a metallic grid having peak and valley surfaces, said grid being formed of a metal which is stable in a lead chloride seawater battery system;
    terminal means electrically connected to said grid;
    a coating of lead chloride supported on said grid surfaces, said coating having an outer reaction surface; and,
    a matrix of conductive lead formed in situ to provide initial current flow intermediate portions of said coating outer reaction surface and contiguous peaked portions of said grid surfaces providing current discharge path between said reaction surface and said grid.

12. The battery cell of claim 11 wherein said lead chloride is applied to said grid by dipping said grid in molten lead chloride.

13. The battery cell of claim 12 wherein the cathode metallic grid comprises expanded metal.

14. The battery cell of claim 12 wherein the cathode comprises a metal selected from the group of nickel, calcium, silver, palladium, gold, titanium, stainless steel and Monel.

* * * * *

UNITED STATES PATENT OFFICE
CERTIFICATE OF CORRECTION

PATENT NO. : 4,021,597
DATED : May 3, 1977
INVENTOR(S) : Leonard Joseph Burant

It is certified that error appears in the above-identified patent and that said Letters Patent are hereby corrected as shown below:

Column 1, line 65, "nd" should be -- and --.

Column 2, line 13, after "the expanded" insert -- metal --.

Claim 1, line 10, delete "to" first occurence and substitute -- of --.

Claim 11, line 15, following "providing" insert -- a --.

Signed and Sealed this second Day of August 1977

[SEAL]

Attest:

RUTH C. MASON
Attesting Officer

C. MARSHALL DANN
Commissioner of Patents and Trademarks